US010863670B2

(12) United States Patent
Kang

(10) Patent No.: US 10,863,670 B2
(45) Date of Patent: Dec. 15, 2020

(54) TRIMMER HEAD

(71) Applicant: AMKOR Trading, Inc., Macon, GA (US)

(72) Inventor: Kwang Won Kang, Jamgseong-gum (KR)

(73) Assignee: AMKOR TRADING, INC., Byron, GA (US)

( * ) Notice: Subject to any disclaimer, the term of this patent is extended or adjusted under 35 U.S.C. 154(b) by 0 days.

(21) Appl. No.: 15/735,575

(22) PCT Filed: Jun. 8, 2016

(86) PCT No.: PCT/KR2016/006047
§ 371 (c)(1),
(2) Date: Dec. 11, 2017

(87) PCT Pub. No.: WO2017/043737
PCT Pub. Date: Mar. 16, 2017

(65) Prior Publication Data
US 2018/0295775 A1    Oct. 18, 2018

(30) Foreign Application Priority Data
Sep. 10, 2015   (KR) .................... 10-2015-0128495

(51) Int. Cl.
*A01D 34/73* (2006.01)
*A01D 34/81* (2006.01)
(Continued)

(52) U.S. Cl.
CPC .......... *A01D 34/736* (2013.01); *A01D 34/733* (2013.01); *A01D 34/81* (2013.01); *A01D 34/90* (2013.01); *A01D 2101/00* (2013.01)

(58) Field of Classification Search
CPC ...... A01G 3/06; A01G 3/062; A01D 2101/00; A01D 34/733; A01D 34/412;
(Continued)

(56) References Cited

U.S. PATENT DOCUMENTS 4,114,354 A * 9/1978 Morris ............... A01D 34/6806
56/295
4,790,071 A * 12/1988 Helmig .............. A01D 34/4166
30/276

(Continued)

FOREIGN PATENT DOCUMENTS

FR    2717037 B1 *   4/1996    ........... A01D 34/404

*Primary Examiner* — Robert E Pezzuto
*Assistant Examiner* — Adam J Behrens
(74) *Attorney, Agent, or Firm* — Michael J. Bootcheck, LLC; Michael J. Bootcheck

(57) ABSTRACT

A trimmer head having an upper case having a fastening portion formed with an upper fastening hole for coupling the rotating shaft to a center of the upper case; a lower case formed with a lower fastening hole at its center and the lower case being coupled to the upper case; a body portion positioned in a cavity between the upper case and the lower case; and a plurality of cutting means coupled to the body portion so as to be rotatable at one end thereof, wherein the upper case and the lower case are further connected to each other by a plurality of elastic media and are spaced apart by the tension of the elastic medium when the upper case and the lower case are separated from each other.

13 Claims, 6 Drawing Sheets

(51) Int. Cl.
*A01D 34/90* (2006.01)
*A01D 101/00* (2006.01)

(58) Field of Classification Search
CPC .............. A01D 34/416; A01D 34/4165; A01D 34/4166; A01D 34/4167; A01D 34/736; A01D 34/84; A01D 34/863; A01D 34/81; A01D 34/90
See application file for complete search history.

(56) References Cited

U.S. PATENT DOCUMENTS

| | | | | |
|---|---|---|---|---|
| 5,622,035 A * | 4/1997 | Kondo | ................. | A01D 34/733 30/276 |
| 5,649,413 A * | 7/1997 | Oostendorp | ....... | A01D 34/4168 172/15 |
| 5,722,172 A * | 3/1998 | Walden | ................ | A01D 34/736 30/276 |
| 5,791,054 A * | 8/1998 | Bessinger | .......... | A01D 34/4166 30/276 |
| 6,052,907 A * | 4/2000 | Wang | ................... | A01D 34/416 30/276 |
| 6,112,416 A * | 9/2000 | Bridges | ................ | A01D 34/736 30/276 |
| 6,119,350 A * | 9/2000 | Sutliff | .................. | A01D 34/736 30/276 |
| 6,442,845 B2 * | 9/2002 | Wheeler | ............... | A01D 34/416 30/276 |
| 6,681,865 B2 * | 1/2004 | Pace | ....................... | A01B 1/065 172/111 |
| 7,878,097 B2 * | 2/2011 | Strader | ................ | A01D 34/733 30/276 |
| 8,640,588 B2 * | 2/2014 | Strader | ................ | A01D 34/733 30/276 |
| 9,210,838 B2 * | 12/2015 | Jerez | .................... | A01D 34/416 |
| 2003/0230418 A1 * | 12/2003 | Pace | ....................... | A01B 1/065 172/41 |
| 2013/0152359 A1 * | 6/2013 | Jerez | .................... | A01D 34/4166 29/426.6 |
| 2015/0289445 A1 * | 10/2015 | Duvall | ............... | A01D 34/4165 30/276 |

* cited by examiner

TRIMMER HEAD

CROSS-REFERENCE TO RELATED APPLICATIONS

This application claims priority from co-pending PCT Patent Application Ser. No. PCT/KR2016/006047 filed on Jun. 8, 2016, which is titled "CUTTING APPARATUS OF BRUSH CUTTER", and Korean Patent Application KR 10-2015-0128495 filed on Sep. 10, 2015, both of which are hereby incorporated in their entirety by reference.

FIELD OF THE INVENTION

The present invention relates to a trimmer head for use with various lawn mowing devices. In particular, it presents trimmer heads may be used in edgers and trimmers wherein the trimmer head's cutting blades rotate about a shaft wherein the trimmer heads enable a user to quickly and easily replace one or more cutting blades. The trimmer heads may have lower frictional forces that result in increased working speed and durability, while also being light in weight.

The most common type of cutting blades utilized in trimer heads include straight blades, which have good workability among the prior art cutting blades and have a relatively straight forward mounting process. However, the process is inconvenient and time consuming. Another drawback is that the blades are heavy and easily damaged, shortening their life span and being vulnerable to various safety accidents.

Also available are various string trimmer heads which use a string of synthetic resin as a cutting blade. Though it is simple and has better safety, it does not prevent accidents and is most suited for cutting light weeds. This variety is also plagued by a high product breakage rate and the occurrence rate of line junking is high, resulting in a decrease in operation efficiency. It also dictates a relatively complex procedure to replace this type of cutting blade.

SUMMARY OF THE INVENTION

The present invention provides a trimmer head/cutting blades for a lawn/vegetation mower which is coupled to a rotary shaft of the lawn mower. In one embodiment, the trimmer head is coupled to a rotating shaft of a mowing machine, and has: an upper case having a fastening portion formed with an upper fastening hole for coupling the rotating shaft to a center of the upper case; a lower case formed with a lower fastening hole at its center and the lower case being coupled to the upper case; a body portion positioned in a cavity between the upper case and the lower case; and a plurality of cutting blades coupled to the body portion so as to be rotatable at one end thereof, wherein the upper case and the lower case are further connected to each other by a plurality of elastic media and are spaced apart by the tension of the elastic medium when the upper case and the lower case are separated from each other.

BRIEF DESCRIPTION OF THE FIGURES

The attached FIGs. show various exemplary embodiments of the present invention.

DETAILED DESCRIPTION OF THE INVENTION

Figure 1:
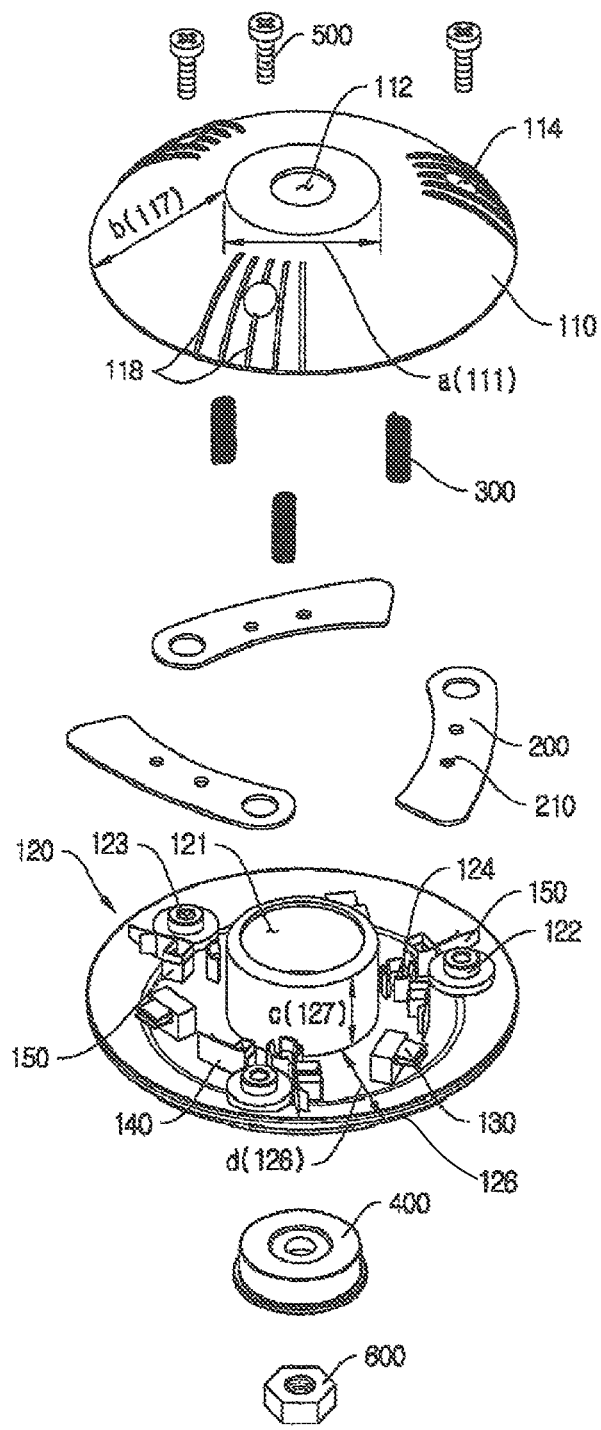
FIG. 1 is an exploded perspective view of a trimmer head for a lawn mower according to an embodiment of the present invention.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It is to be understood, however, that the invention is not to be limited to the specific embodiments, but includes all modifications, equivalents, and alternatives falling within the spirit and scope of the invention. Like reference numerals have been used for like elements in describing each drawing. The terms including ordinal, such as second, first, etc., may be used to describe various elements, but the elements are not limited by the terms.

The terms used herein are used only for the purpose of distinguishing one element from another. For example, without departing from the scope of the present invention, the second component may be referred to as a first component, and similarly, the first component may also be referred to as a second component.

It is to be understood that when an element is referred to as being "connected" or "connected" to another element, it may be directly connected or connected to the other element, but there may be other elements in between. On the other hand, when an element is referred to as being "directly connected" or "directly connected" to another element, it should be understood that there are no other elements in between.

The terminology used herein is for the purpose of describing particular embodiments only and is not intended to be limiting of the invention. The singular forms "a," "an," and "the" include plural referents unless the context clearly dictates otherwise. In the present application, the terms "comprises" or "having" and the like are used to specify that there is a stated feature, number, step, operation, element, part or combination thereof, and does not preclude the presence or addition of one or more other features, integers, steps, operations, elements, components, or combinations thereof.

Unless otherwise defined, all terms used herein, including technical or scientific terms, have the same meaning as commonly understood by one of ordinary skill in the art to which this invention belongs. Terms such as those defined in commonly used dictionaries are to be interpreted as having a meaning consistent with the contextual meaning of the related art and are to be interpreted as an ideal or overly formal sense unless explicitly defined in the present application do not.

Figure 2:
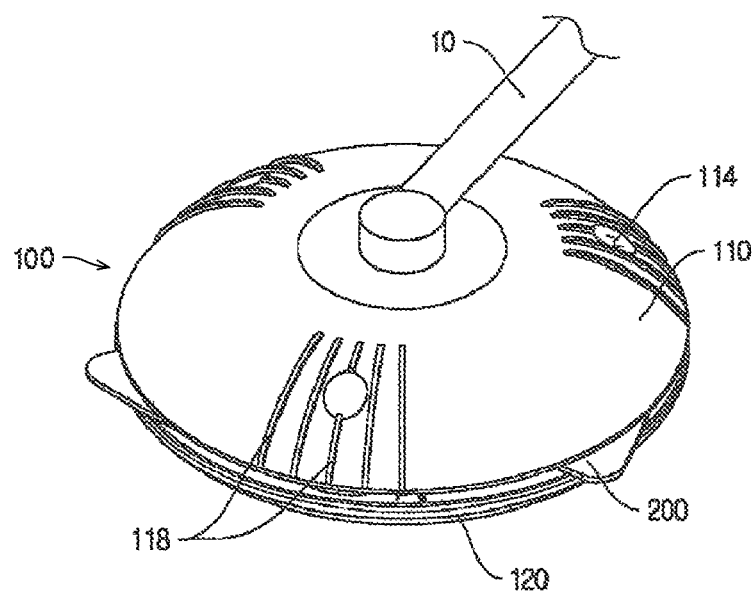
FIG. 2 and FIG. 3 are combined perspective views illustrating a trimmer head according to an embodiment of the present invention.
Figure 3:
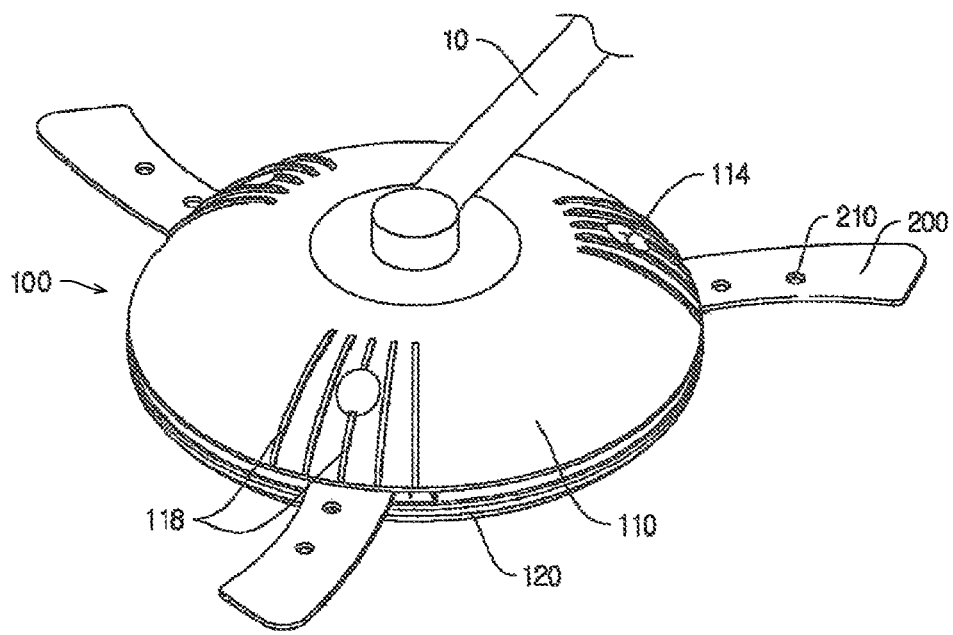
Figure 4:
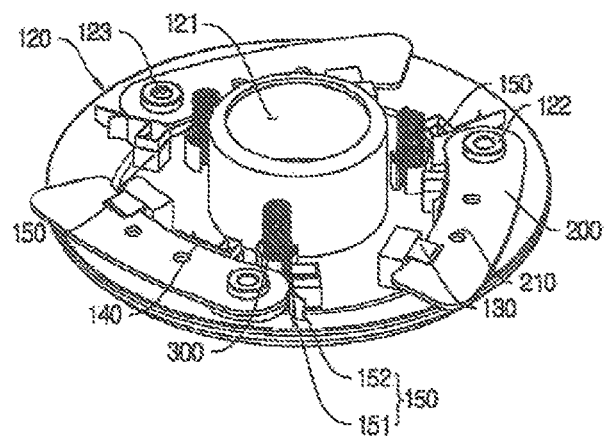
FIG. 4 is a perspective view illustrating a condition in which the upper case of the body is normally opened according to an embodiment of the present invention.
Figure 5:
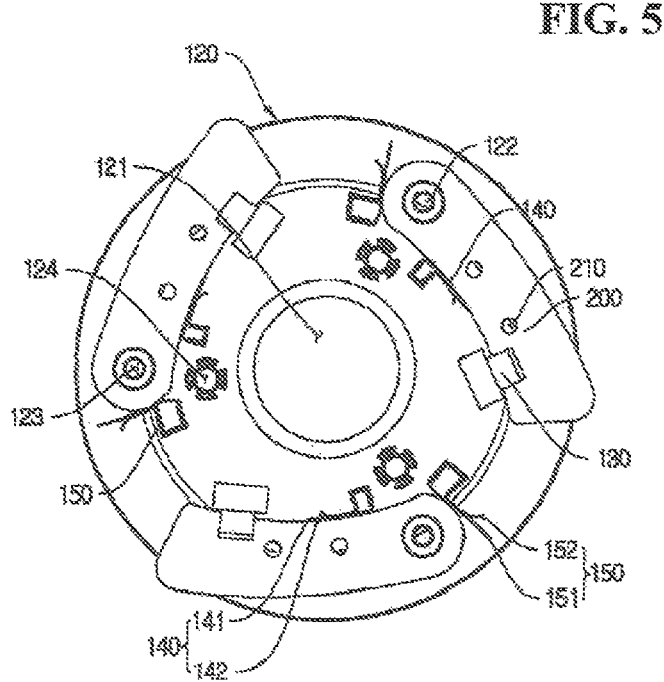
FIG. 5 is a plan view showing a condition in which an upper case of a body part is normally opened according to an embodiment of the present invention.
Figure 6:
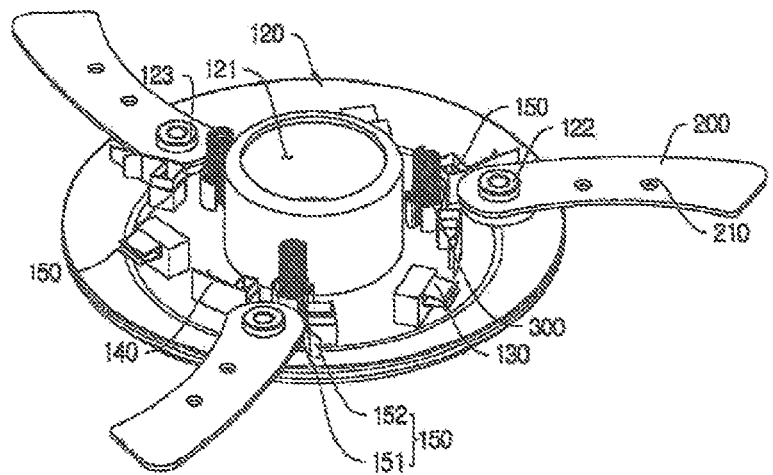
FIG. 6 is a perspective view showing a condition in which an upper case of a body part is opened in an operation according to an embodiment of the present invention.
Figure 7:
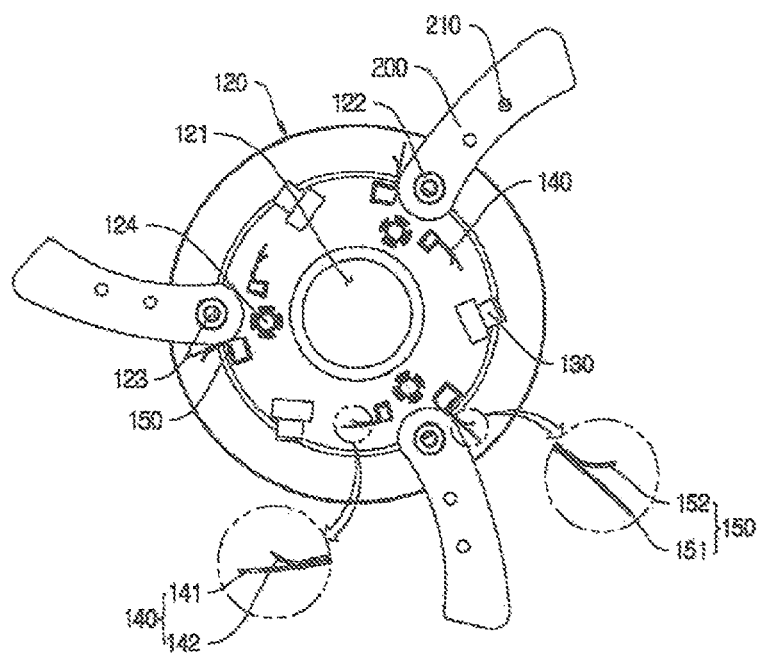
FIG. 7 is a plan view showing a condition in which an upper case of a body part is opened in an operation according to an embodiment of the present invention.
Figure 8:
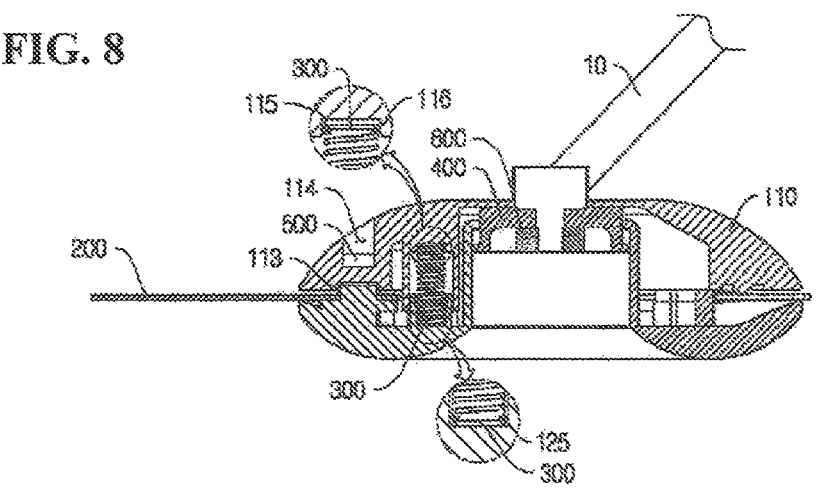
FIGS. 8 to 10 are side cross-sectional views showing the center of the elastic medium according to an embodiment of the present invention.
Figure 9:
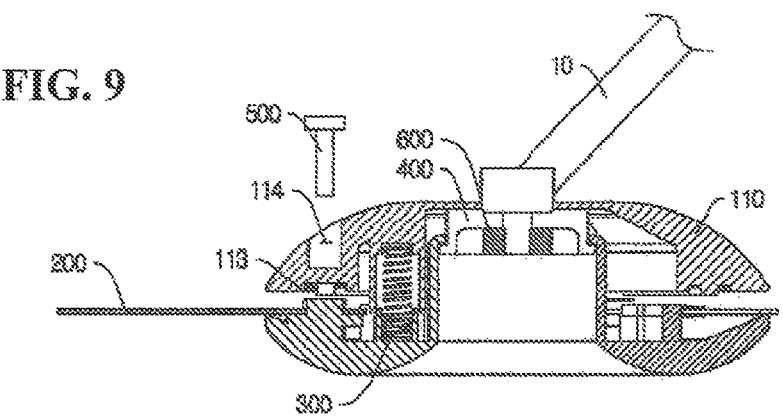
Figure 10:
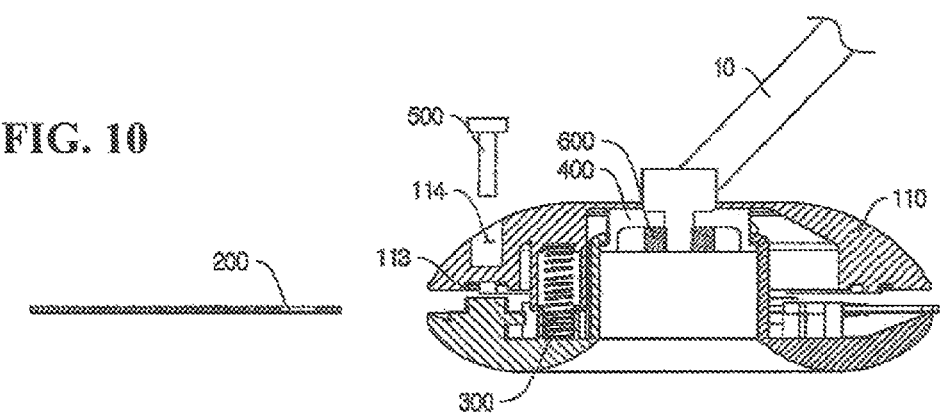
Figure 11:
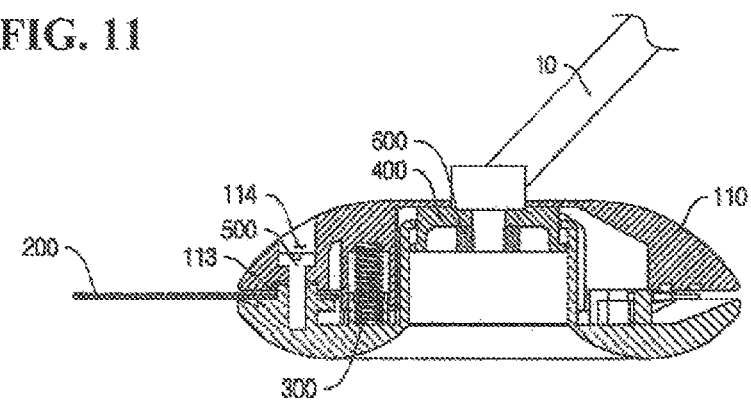
FIG. 11 is a side sectional view showing the center of a bolt according to an embodiment of the present invention.
Figure 12:
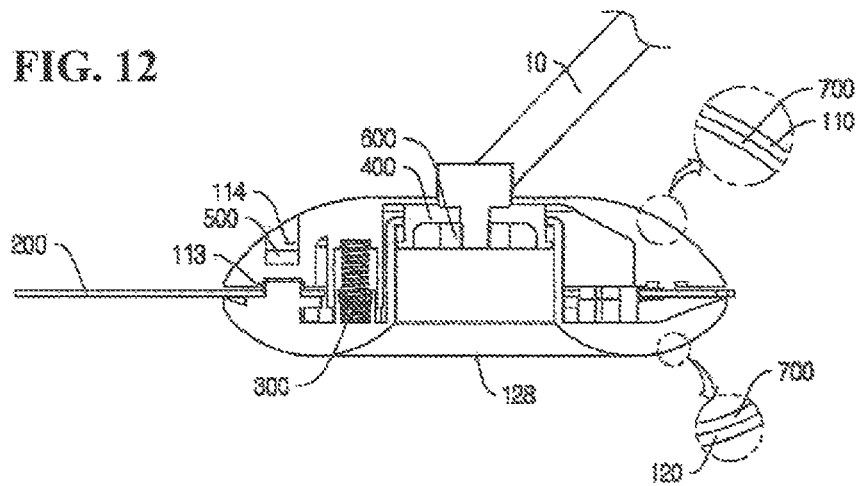
FIG. 12 is a view showing a configuration of an upper case and a lower case according to another embodiment of the present invention.

The various FIGs. incorporated into this specification illustrate various exemplary embodiments. FIG. 1 is an exploded perspective view of a trimmer head for a lawn mower according to an embodiment of the present invention. FIG. 2 and FIG. 3 are combined perspective views illustrating a trimmer head according to an embodiment of the present invention. FIG. 4 is a perspective view illustrating a condition in which the upper case of the body is normally opened according to an embodiment of the present invention. FIG. 5 is a plan view showing a condition in which an upper case of a body part is normally opened according to an embodiment of the present invention. FIG. 6 is a perspective view showing a condition in which an upper case of a body part is opened in an operation according to an embodiment of the present invention. FIG. 7 is a plan view showing a condition in which an upper case of a body part is opened in an operation according to an embodiment of the present invention. FIGS. 8 to 10 are side cross-sectional views showing the center of the elastic medium according to an embodiment of the present invention. FIG. 11 is a side sectional view showing the center of a bolt according to an embodiment of the present invention. FIG. 12 is a view showing a configuration of an upper case and a lower case according to another embodiment of the present invention.

As illustrated in the following figures, the reference numerals are: rotating shaft 10, body part 100, upper case 110, fastening part 111, upper fastening hole 112, upper seating supporting portion 113, coupling hole 114, upper elastic medium insertion hole 115, upper support jaw 116, upper cover 117, protrusion 118, lower case 120, lower fastening hole 121, lower seating portion 122, coupling groove 123, lower elastic medium insertion hole 124, lower support jaw 125, lower cover 126, guide cover 127, opening/closing member 128, cutting blades supporting member 130, first impact preventing member 140, primary impact preventing member 141, secondary impact preventing member 142, second impact preventing member 150, first impact preventing member 151, secondary impact preventing member 152, cutting blades 200, hole 210, elastic medium 300, washer 400, bolt 500, nut 600, and reinforcing member 700.

FIG. 1 is an exploded perspective view of a trimmer head for a lawn mower according to an embodiment of the present invention. The trimmer head may be connected to rotary shaft 10 of a lawn mowing machine and cuts and rotates together upon rotation of rotary shaft 10. Body 100 includes upper case 110, lower case 120, cutting blades supporting member 130, first impact preventing member 140 and second impact preventing member 150. Upper case 110 includes fastening part 111 formed with upper fastening hole 112 at its center and upper cover 117 formed to be rounded in an outer lower direction of fastening part 111. Rotary shaft 10 may be coupled to upper coupling hole 112 from upper portion to the lower portion and upper coupling hole 112 and coupling portion 111 are formed corresponding to the shape of rotary shaft 10. In the figure, a indicates a fastening part 111, and b indicates an upper cover 117.

Upper case 110 may be made of a lightweight and durable synthetic resin material. The shape of upper cover 117 is an exemplary embodiment and various modifications are possible. In some embodiments, this is only desirable if the shape of the upper case 110 does not result in increased rotational resistance.

A plurality of protrusions 118 may be formed on the upper portion of upper case 110 to a predetermined height. For reference, protruding portion 118 is shown only for convenience in the FIGs. In operation, projecting portion 118 causes debris, such as cut weeds and grass to be dispersed and scattered, thus projecting portion 118 prevents the grass, twigs, and the like from getting into the inside of body 100. In addition, protrusion 118 also prevents slippage when upper case 110 and lower case 120 are detached from each other, gripping is very easy.

Although a plurality of protruding portions 118 are illustrated at predetermined intervals in a radial position from the center of the rotational axis, it is not required to limit their position, number, shape, size, and height of the various protruding portions 118. In addition, although they are arranged at regular intervals in this embodiment, they may be arranged at irregular intervals or may be arranged on other circumferences other than the same circumference. When projecting portion 118 is formed around the upper portion of coupling hole 114 as shown in the drawing, foreign substances such as grass, or the like, may be prevented from entering into body 100 through coupling hole 114.

Lower case 120 may be fastened at a lower portion of upper case 110 to form the entire body of body 100, and lower fastening hole 121 may be formed at its center. Lower case 120 may have a width corresponding to the width of upper cover 117 and may be formed in the upper vertical direction at the inner end of lower cover 126 and lower cover 126 may be coupled to the lower portion of upper cover 117 with guide cover 127.

C in the drawing shows guide cover 127, and d indicates lower cover 126. The shape of body 100 as a whole may be completed by the combination of upper case 110 and lower case 120. Cutting unit 200 may be rotatably coupled to lower case 120. Cutter unit 200 may normally be inserted into body 100 and protrude to the outside of body 100 by a rotational force during rotation to performs a mowing operation.

Upper case 110 and lower case 120 may further be connected to each other by a plurality of elastic media 300. Upper case 110 and lower case 120 may be fastened and fixed by bolts 500. However, when bolts 500 are loosened, upper case 110 and lower case 120 may be automatically separated from each other by the tension of elastic medium 300 (i.e., upper case 110 and lower case 120 may be biased apart from each other).

Washer 400 may be inserted into the lower portion of lower fastening hole 121 and fastened and fixed by nut 600 with rotary shaft 10 inserted through upper fastening hole 112.

FIGS. 2 and 3 are perspective views illustrating a condition in which cutting blade(s) 200 protrude and retract from body 100.

FIG. 4 is a perspective view illustrating a condition in which the upper case of the body is normally opened according to an embodiment of the present invention.

FIG. 5 is a perspective view illustrating a condition where upper body 110 of body 100 may be opened according to an embodiment of the trimmer head.

FIG. 6 is a plan view showing a condition in which upper case 110 of body 100 may be opened by a user, according to an embodiment of the trimmer head for lawn mower according to the present invention is opened.

FIG. 7 is a plan view showing a condition in which upper case 110 of body 100 may be opened in an operation according to an embodiment of the trimmer head for the lawn mower according to the present invention.

In FIGS. 2 and 3, a lower end portion of rotary shaft 10 on which the male thread tab is formed may be inserted through upper fastening hole 112. Although not shown in detail, washer 400 may be fastened to lower fastening hole 121. It may be fastened and fixed to rotating shaft 10 and nut 600 may be inserted through upper fastening hole 112 by nut 600.

Lower case 120 may be formed with lower seating portion 122 to which cutting blades 200 may be rotatably inserted and is seated and supported.

Cutting blades 200 can be formed as two or four or more, but is illustrated with three at intervals of 120 degrees in some embodiments. In some embodiments, cutting blades 200 may be formed to be curved in the opposite direction of rotation (clockwise with reference to FIG. 7).

FIG. 7 illustrates the rotation direction of body 100 to be counterclockwise in this embodiment, and cutting blades 200 is curved in the clockwise direction. At least one hole 210 may be formed in cutting blades 200, and hole 210 may be selectively formed. That is, in addition to the fastening holes (not shown) fastened to lower seating portion 122, it is possible to prevent cutting blades 200 from being raised by the rotational force due to the additional configuration of holes 210. The size, position, number and the like of holes 210 may be determined in consideration of the rotational force.

Lower case 120 may be formed with a cutting blades supporting member 130 for supporting cutting blades 200 which may be inserted into body 100 at a predetermined elasticity so as not to protrude outside body 100.

Cutting blades support member 130 may be formed in a "C" shaped shape so that the openings are curved in the outward direction to guide the insertion of cutting blades 200 smoothly sliding inward when cutting blades 200 enters, such that they are spaced apart from each other with a predetermined elasticity.

Cutting blades 200 inserted into cutting blades supporting member 130 may be supported by the elastic force and artificially applied a predetermined force or separated by the rotational force when body 100 rotates.

Lower case 120 may be formed with a first impact preventing member 140 that reduces the insertion speed of cutting blades 200 when cutting blades 200 is inserted into cutting blades supporting member 130.

First impact-preventing member 140 may be composed of various elastic springs and the like. Cutting blades 200, when, if it collides with a hard object such as a stone during a mowing operation, is configured such that it is possible to prevent a phenomenon in which body 100 is strongly collided with the inside of the body part 100 by the elastic force.

FIGS. 4 and 5 illustrate first shock-preventive member 140 which may include a primary shock-preventive member 141 that firstly alleviates an impact upon insertion of cutting blades 200, 141 for relieving the impact after the impact has occurred.

Primary impact-preventing member 141 and secondary-impact-preventing member 142 may be formed of a leaf spring formed by bending and formed into a single body.

Secondary impact preventing member 142 may be located behind primary impact preventing member 141 and may be formed to be shorter than the length of primary impact preventing member 141. Some embodiments may be arranged/configured so as to be rounded in the direction in which means cutting blade(s) 200 is inserted. That is, when cutting blades 200 is inserted, the insertion speed and the impact are lowered and alleviated by first primary impact preventing member 141, and primary impact preventing member 141 may be bent to the inside of body portion 100, and, at the same time, secondarily supported by secondary impact-preventing member 142, insertion speed and impact are reduced and mitigated once more.

Cutting blades 200 inserted into body part 100 when first impact preventing member 140 is not formed is intruded intact by cutting blades supporting member 130 and collides with the cutting blades supporting member 130 as it is. Because it is repetitive, there are many impacts, and cracking of the trimmer head itself of the cutter is inevitably damaged. Therefore, the durability of the product can be further extended by the configuration of first shock-absorbing member 140.

In some embodiments, the elastic force of first impact preventing member 140 pushing cutting blades 200 to the outside of body 100 is smaller than the elastic force of cutting blades supporting member 130.

Lower case 120 may limit the maximum angle (also referred to as angle limiting portion and there may also be additional angle limiting portions which may be attached to, or even incorporated with, lower case 120) at which cutting blades 200 protrudes to the outside of body 100 on the basis of the condition in which cutting blades 200 is inserted into cutting blades supporting member 130. A second shock-absorbing member 150 for relieving an impact transmitted to cutting blades 200 when protruding at a maximum angle, and various resilient springs is included in some embodiments. In other words, it is also important to prevent the impact being transmitted when cutting unit 200 is inserted into body 100. However, the impact transmitted to cutting unit 200, which protrudes to the outside of body 100 during the mowing operation, can also be prevented in some embodiments.

In general, cutting blades 200 is positioned at an angle of 90 degrees with no additional external force about the rotational axis, and is continuously rotated due to the rotation of body 100 during the mowing operation. However, at the time of initial rotation (i.e., start up), the body portion 100 is projected along the rotational radius at an angle of 90 degrees or more relative to the outside of body portion 100 by the rotational force, so that it collides with the body of body portion 100.

Therefore, second impact-preventing member 150 may be configured to prevent direct collision with the body of body 100 and mitigate the impact force in the event of a collision. In addition, the position of the leaf spring may be positioned at 90 degrees with respect to the radius of rotation of cutting blades 200, but when placed at 100 degrees, the impact may be more reliably relieved.

FIG. 6 is a plan view showing a condition in which upper case 110 of body 100 may be opened by a user, according to an embodiment of the trimmer head for lawn mower according to the present invention is opened.

FIG. 7 is a plan view showing a condition in which upper case 110 of body 100 may be opened in an operation according to an embodiment of the trimmer head for the lawn mower according to the present invention.

Collectively, FIGS. 6 and 7 illustrate second shock-preventive member 150 having first shock-absorbing member 151 that firstly alleviates an impact when cutting blades 200 protrudes, a second shock, secondary impact preventing member 152 is also present for relieving the impact of the secondary shock after the impact is relieved.

Primary impact preventing member 151 and secondary impact preventing member 152 may also be formed of a leaf spring formed by bending and formed into a single body. Secondary impact preventing member 152 may be located behind primary impact preventing member 151 and may be formed to be shorter than the length of primary impact preventing member 151. Some embodiments may be arranged so as to be rounded in a direction in which the cutting blade(s) 200 protrudes. That is, when cutting blades 200 protrudes, the protrusion speed and the impact are reduced and alleviated by first primary impact preventing member 151, and primary impact preventing member 151 is located outside the body 100 and at the same time secondarily supported by secondary impact preventive member 152, the insertion speed and impact may be reduced and mitigated once more.

Cutting member supporting member 130, first impact-preventing member 140, and second impact-preventing member 150 can perform their respective roles so that it is may not be desirable to limit the structure, size, shape, kind, ratio, position.

FIG. 8 is a cross-sectional view illustrating a condition where upper case 110 and lower case 120 are fastened and fixed with bolts 500 with reference to the center of elastic medium 300. FIG. 10 is a sectional view showing a condition in which upper case 110 and lower case 120 are separated from each other by elastic medium 300, cutting blades 200 are separated from each other, and FIG. 11 illustrates a sectional view showing the condition of FIG. 8 with reference to the center of bolt 500.

As shown in FIGS. 8 and 11, when lower case 120 is coupled to upper case 110, cutting blades 200, which is seated and supported by lower seating portion 122, is separated from lower seating portion 122, and upper seating supporting portion 113 is formed.

Also in FIG. 11, the inner edge portion of upper seating support portion 113 is fastened to the outer edge portion of lower seating portion 122 and is supported by lower seating portion 122 such that the cutting blades 200, do as well.

Coupling hole 114 is formed in the upper seating support portion 113 and coupling groove 123 is formed in the lower seating portion 122 to correspond to coupling hole 114. Bolt 500 is inserted and fastened to coupling groove 123 so that upper case 110 and lower case 120 are fastened together. Although not shown in detail, a screw tab may be formed on the inner edge of coupling groove 123.

In the illustrated embodiment, upper and lower cases 110 and 120 are fastened (separated) by fastening (separating) cutting blades 200 through upper seating support portion 113 and lower seating portion 122. Bolt 500 is fastened to coupling groove 123 through coupling hole 114 to fasten upper case 110 and lower case 120 together with lower seating portion 122, cutting blades 200 fastened and fixed by fastening member to securely fasten the double fastening device.

Upper case 110 is coupled to rotary shaft 10 by the tension of elastic medium 300. Upper case 110 is coupled to lower case 120, however, since lower case 120 has a property of being spaced apart from lower case 120, it is possible to assist in preventing bolt 500 from loosening during the mowing operation.

Upper case 110 is formed with upper elastic medium insertion groove 115 in which the upper end of elastic medium 300 is inserted and supported and lower case 120 has a lower elasticity, and medium insertion groove 124 is formed. Lower elastic medium insertion groove 124 is formed with a lower end portion of elastic medium 300 in the upper end portion of upper elastic medium insertion groove 115, and lower support tab 125 is formed to be fixed.

FIG. 9 illustrates a condition when bolt 500 is removed, upper case 110 and lower case 120 are spaced apart from each other by the tension of elastic medium 300, and elastic medium 300 is expanded into a main body shape. At this time, the inner circumferential surface of upper elastic medium insertion groove 115 at the time of engagement (fastening) and separation (separation) of upper case 110 and lower case 120 is formed on the outer peripheral surface of lower elastic medium insertion groove 124, in some embodiments to configure it to be positioned.

As described above, foreign matter such as grass or twigs entering into the inside of body part 100 during the mowing operation can be prevented from penetrating into upper elastic medium insertion slot 115 and lower elastic medium insertion slot 124. The upper end of guide cover 127 forms a step inward and the lower end of washer 400 forms a step toward the outer side so that upper case 110 and lower case 120 is limited by the distance between guide cover (127) and washer (400). In other words, as shown in FIG. 8, when bolts 500 are fastened, the parts are spaced from each other, and as shown in FIG. 9, when the bolts 500 are separated from each other, In this embodiment, guide cover 127 covers the inner circumferential surface of body 100 and primarily prevents the impurities from penetrating into body 100. In addition, the infiltrated foreign matter or the like is prevented from penetrating secondarily by the constitution of upper elastic medium insertion groove 115 and lower elastic medium insertion groove 124 as described above. In some embodiments, the jaw on which cutting blades 200 of lower seating portion 122 is seated and supported is formed higher than the upper surface of the outer periphery of lower case 120 so as not to interfere with the turning operation of cutting blades 200.

In some embodiments, the lower end surface of upper seating support portion 113 is formed at a predetermined height from the upper surface of cutting blades 200 so as not to interfere with the turning operation of cutting blades 200 when bolts 500 are engaged. Meanwhile, when bolts 500 are separated, upper seating support portion 113 and lower seating portion 122 are spaced apart from each other by more than the thickness of cutting blades 200. Therefore, even when the cutting apparatus of the present invention is not completely separated, cutting blades 200 can be easily separated and fastened through the separated spaces by separating only bolts 500.

Since lower cover 126 is formed to be rounded to the lower side, the contact area with the ground during the mowing operation is minimized, and the frictional force can be minimized. In addition, lower case 120 is combined with upper case 110 and rotated together with the friction force being minimized, so that lower case 120 is more easily moved during a mowing operation and the operation speed is increased.

Washer 400 is coupled to rotary shaft 10 and nut 600 through lower coupling hole 121 so as to rotate with rotary shaft 10 and upper case 110 interlocked with each other and inserted into the upper coupling hole 112.

FIG. 12 is a view showing a condition of upper case 110 and lower case 120 according to another embodiment of the trimmer head of the lawn mower according to the present invention, and the condition of opening and closing member 128 is schematically shown together. Reinforcing member 700 is further coupled to the inner surface of at least one of upper case 110 and lower case 120. Since upper case 110 and lower case 120 may be made of a synthetic resin material, they can be easily worn when rubbed by the continuous rotation, so that the durability can be improved by further constructing reinforcing member 700 on the inner side. Reinforcing member 700 may be formed in both upper case 110 and lower case 120. However, in some embodiments, reinforcing member 700 may be formed in lower case 120 having a large friction with the floor surface during the mowing operation. It is also possible to configure only the portion (bending portion) directly contacting the bottom surface of lower case 120.

Reinforcing member 700 may be formed of various materials, but, in some embodiments, reinforcing member 700 is made of stainless steel in consideration of weight, corrosion resistance, durability, and the like.

Lower case 120 may further include an opening and closing member 128 which may be detachably attached to the lower end of lower fastening hole 121 to open and close lower fastening hole 121.

The structure of opening/closing member 128 may be omitted because the structure-like foreign matter or the like of the present invention is less likely to penetrate into the inside of body part 100. However, opening/closing member 128 may also prevent foreign matter from penetrating.

Opening and closing member 128 may constitute a detachable portion (not shown) at the lower end of lower case 120 and a detachable portion (not shown) corresponding to the rim of opening and closing member 128 and removes the detachable portion.

Various members of the exemplary embodiments of the present invention may be made of any suitable material. Various members of the exemplary embodiments of the present invention may be made of any suitable dimensions and thicknesses.

Although various components of the present invention may be illustrated as being of a particular shape for convenience, such components may be of any suitable shape, configuration, orientation, etc. Further, any number of additional components may be added to a particular embodiment to accommodate a particular need.

Note that there may be possible advantages of sloping or cutting away part of the material of one or more components, i.e., to utilize less material, or to decrease the weight of the device. As one of ordinary skill in the art would recognize, some advantage can be gained in using less material, but some minimum of material must be maintained to provide sufficient structural integrity for the device to be useful.

While the specification has been described in detail with respect to specific embodiments thereof, it will be appreciated that those skilled in the art, upon attaining an understanding of the foregoing, may readily conceive of alterations to, variations of, and equivalents to these embodiments.

The invention claimed is:

1. A trimmer head, said trimmer head comprising:
a body having an upper case and a lower case;
said upper case having a fastening portion formed with an upper fastening hole for coupling a rotating shaft to a center of said upper case;
said lower case having a lower fastening hole at its center and said lower case being coupled to said upper case;
one or more cutting blades coupled to said body so as to be rotatable at one end thereof,
wherein said upper case and said lower case are further connected to each other by one or more elastic media and are spaced apart by said elastic media; and
said lower case is formed with a plurality of lower seating portions onto which said one or more cutting blades is rotatably inserted and supported, and said upper case is formed with a plurality of upper seating support portions corresponding with the lower seating portions when said upper case is engaged with said lower case.

2. The trimmer head of claim 1,
wherein each said plurality of upper seating support portions are formed with a coupling hole,
each said plurality of lower seating portions are formed with a coupling groove, and
at least one bolt insertable through said coupling hole to couple with said coupling groove, thereby coupling said upper case and said lower case.

3. The trimmer head of claim 2,
wherein when said at least one bolt is separated, said upper case and said lower case are spaced apart by said elastic media, and each of said plurality of upper seating support portions and each of said plurality of lower seating portions are spaced apart from each other by a thickness equal to or greater than a thickness of said one or more cutting blades.

4. A trimmer head, said trimmer head comprising:
a body having an upper case and a lower case;
said upper case having a fastening portion formed with an upper fastening hole for coupling a rotating shaft to a center of said upper case;
said lower case having a lower fastening hole at its center and said lower case being coupled to said upper case;
one or more cutting blades coupled to said body so as to be rotatable at one end thereof, wherein said upper case and said lower case are further connected to each other by one or more elastic media and are spaced apart by said elastic media; and
an outer rim portion is formed by said upper case and said lower case,
said upper case includes an upper cover formed to be rounded,
said lower case includes a lower cover having a width corresponding to a width of said upper cover and coupled to a lower portion of said upper cover, and a guide cover formed in an upper vertical direction at an inner end of said lower cover,
a washer coupled within said guide cover and said lower fastening hole and fastened to an end of said rotating shaft inserted through said upper fastening hole, and
wherein an upper end of said guide cover forms a step in an inward direction and a lower end of the washer forms a step in an outward direction.

5. A trimmer head, said trimmer head comprising:
a body having an upper case and a lower case;
said upper case having a fastening portion formed with an upper fastening hole for coupling a rotating shaft to a center of said upper case;
said lower case having a lower fastening hole at its center and said lower case being coupled to said upper case;

one or more cutting blades coupled to said body so as to be rotatable at one end thereof, and one or more cutting blades supporting members for supporting said one or more cutting blades when said one or more cutting blades is inserted into said body with a predetermined elasticity so as not to protrude to an outside of said body, a first impact preventing member for lowering an insertion speed of said one or more cutting blades when said one or more cutting blades is inserted into said one or more cutting blades supporting members, and wherein said upper case and said lower case are further connected to each other by one or more elastic media and are spaced apart by the elastic media.

6. The trimmer head of claim 5, wherein said first impact preventing member comprises: a primary impact preventing member for relieving a shock from an impact primarily when said one or more cutting blades is inserted; and a secondary impact preventing member for relieving excess impact shock.

7. The trimmer head of claim 6, wherein said secondary impact preventing member is located at a rear side of said primary impact preventing member.

8. The trimmer head of claim 5, a first angle limiting portion for limiting a maximum angle at which said one or more cutting blades protrudes to said outside of said body.

9. The trimmer head of claim 8, wherein the maximum angle is 100 degrees.

10. The trimmer head of claim 8, wherein said first impact preventing member comprises: a primary impact preventing member for relieving an impact primarily at a time of protrusion of said one or more cutting blades; and a secondary impact preventing member for relieving a secondary impact.

11. The trimmer head of claim 10, wherein said secondary impact preventing member is located at a rear side of said primary impact preventing member and is formed to be shorter than a length of said primary impact preventing member and an end portion of said secondary impact member is formed in a direction in which said one or more cutting blades protrudes.

12. The trimmer head of claim 5, further comprising one or more protrusions formed on at least one of said one or more cutting blades.

13. The trimmer head of claim 8, wherein said first angle limiting portion is part of said lower case.

* * * * *